April 16, 1968 R. E. COLLIN ETAL 3,378,102
VEHICLE SPEED GOVERNING WITH EXTERNAL COMMAND CONTROL
Filed May 27, 1966 3 Sheets-Sheet 1

INVENTORS
ROBERT E. COLLIN
HAROLD F. KLOCK
BY
THEIR ATTORNEY

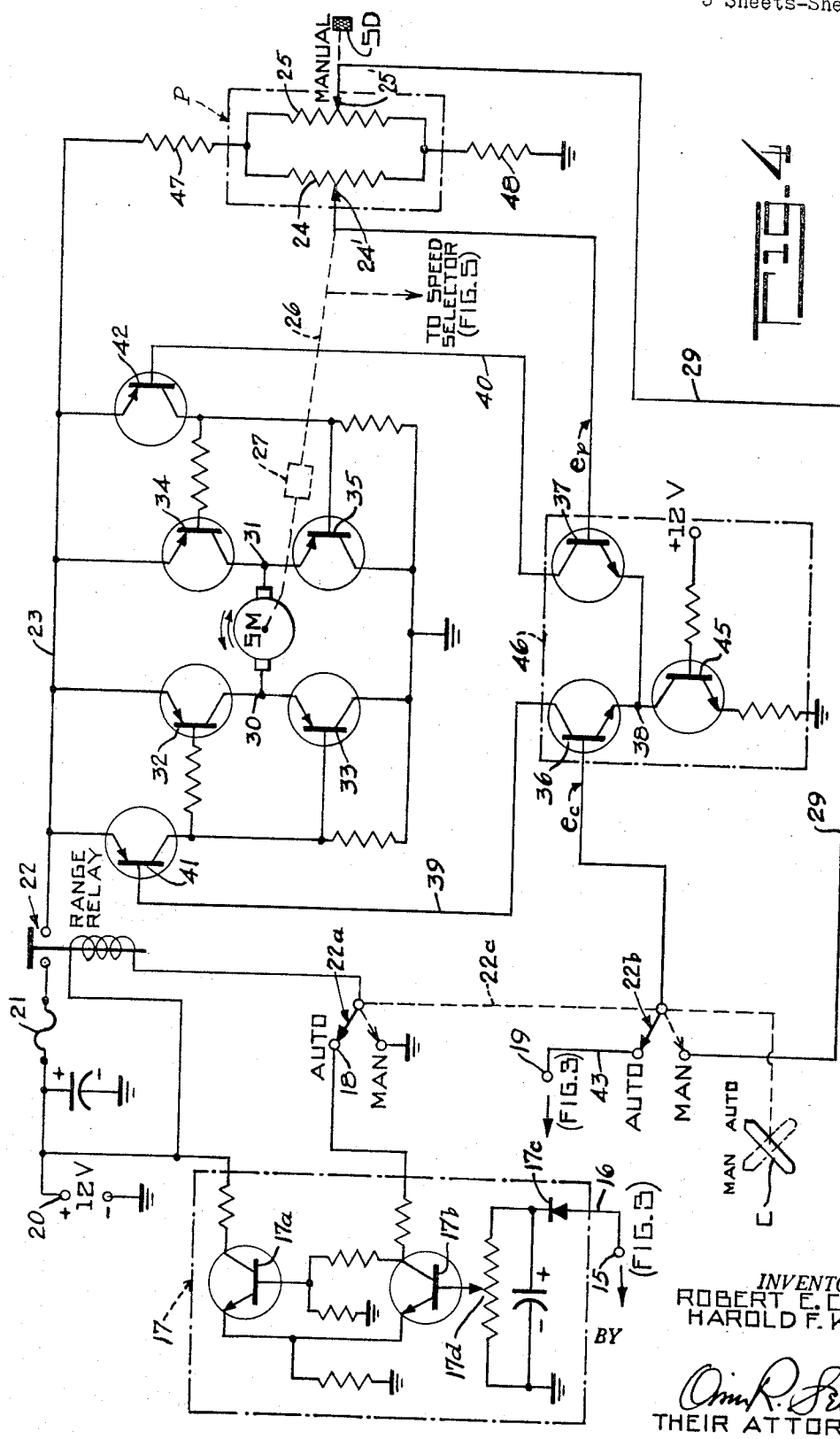

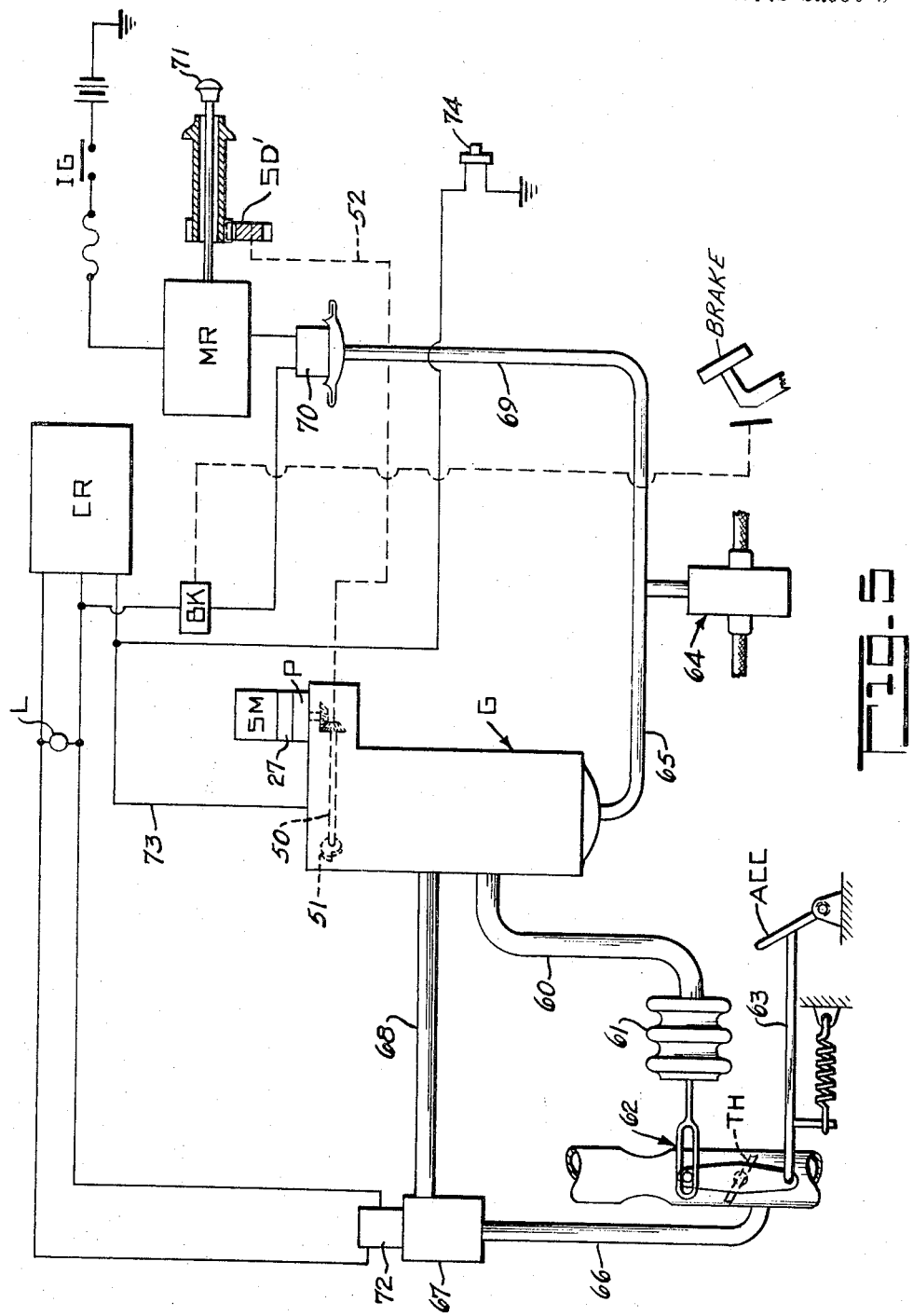

United States Patent Office 3,378,102
Patented Apr. 16, 1968

3,378,102
VEHICLE SPEED GOVERNING WITH
EXTERNAL COMMAND CONTROL
Robert E. Collin, Mayfield Heights, and Harold F. Klock,
University Heights, Ohio, assignors to Curtiss-Wright
Corporation, a corporation of Delaware
Filed May 27, 1966, Ser. No. 553,473
10 Claims. (Cl. 180—98)

This invention relates to highway speed control of motor vehicles and, in particular, to automatic highway speed governing according to a zone command speed that is arbitrarily established by highway authorities for defined portions of the highway and, alternatively, in the normal mode, to a driver-selected speed.

Systems of this general character have been proposed wherein a source of reference speed information is stationed along a highway to define speed zones. As the vehicle traverses a zone or zones, this zone reference or command speed information is conveyed either actively or passively to the vehicle by pick-up apparatus, where it is processed in relation to the actual speed of the vehicle for conforming its speed to that of the zone command speed.

In the "active" systems above, the zone command speed information may be established, for example, by a transmitter for producing radio, sonic, etc., signals of a predetermined frequency for representing the particular command speed, and in the "passive" systems, spaced magnetic or electromagnetic means may be emplaced in the roadbed for producing, in combination with suitable pick-up means in the vehicle, zone speed control signals. In some prior art systems, limited override of the speed command signals by the driver is provided for emergencies requiring a temporary increase in speed and, in general, these systems directly control the vehicle, e.g., by means of the car brakes, throttle, ignition, etc.

The aforesaid systems have a number of inherent disadvantages, including complexity, cost of installation, incompatibility with the usual controls, etc., of conventional motor vehicles and lack of flexibility for practical and modern driving procedure.

In accordance with the present invention, the vehicle is basically equipped with an automatic speed governor having a speed selector that is commercially available and readily installed in the conventional motor system. The speed selector setting is normally adjustable at the option of the driver. In the invention, it is automatically adjustable by servo means under control of a signal receiver system that is responsive to a zone command speed signal. In a preferred embodiment of the invention, each one-way speed zone has stationed at the entry thereof a radio transmitter set at a predetermined frequency for radiating signal pulses. These pulses are picked-up at zone entry by a receiver in the vehicle and processed for controlling the speed selector servo that in turn sets the car's automatic governor at the command speed.

The speed selector of the governor may be under either driver-selected or command speed control and can be overridden in emergency situations by the driver simply pressing the accelerator; also, the governor, while under either type of selector control above, may be made inoperative instantly by initial movement of the brake pedal. Accordingly, the zone command control and the automatic governor control are integrated into a system having desirable safety features and practical operating simplicity.

In accordance with a useful and practical feature of the ivention, an accessible manual control is mounted, for example, on the receiver equipment adjacent to the car's instrument panel for adjustment to either a "manual" or an "automatic" position. This adjustment is ordinarily made by the driver at the beginning of a trip. If the route is primarily on secondary highways, or highways not provided with zone speed commands, the setting would be on "manual," and the driver would use the automatic governor at his discretion. If the route includes the zone speed commands, the setting would be on "automatic" and the control system would then automatically vary the car speed from zone to zone according to the respective commands.

It is therefore a principal object of this invention to provide an improved highway speed governing system that is flexible in relation to modern driving requirements, that governs accurately in confomring to the zone command speed, that is compatible with both zone speed command control and driver-adjusted automatic speed control, that is simple in construction and operation and that has smooth transition from zone to zone commands and from manual to command speed governing, and vice versa.

The invention will be more fully set forth in the following description referring to the accompanying drawings, and the features of novelty will be pointed out with particularity in the claims annexed to and forming a part of this specification.

Referring to the drawings:

FIG. 4 is a more detailed illustration of the transistorized servo system with range control; and FIG. 5 illustrates schematically the speed selector servo in relation to engine speed governing.

Figure 1:
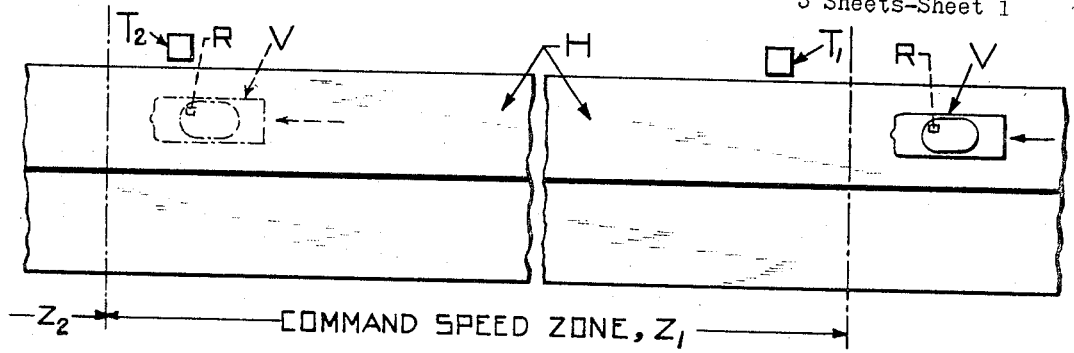
FIG. 1 is a diagram of a zoned highway for radio control of the speed of motor vehicles according to the present invention.

In FIG. 1, a highway H is indicated with a portion of its length defined by a so-called "command speed zone," wherein vehicular speed is to be arbitrarily limited to a predetermined maximum, say 35 m.p.h. For practicing the present invention, a radio transmitter $T_1$ is located along a side of the highway at one zone limit (assume entry), and a second radio transmitter $T_2$ is similarly located at the zone terminus. These transmitters have short-range capability, such as 100–200 feet, and generate a spaced pulse signal that represents the maximum or command speed (35 m.p.h.) for the zone above, $Z_1$. Transmitter $T_2$ at terminus of zone $Z_1$, i.e., entry of zone $Z_2$, is set for another frequency for the $Z_2$ zone speed.

Figure 2:
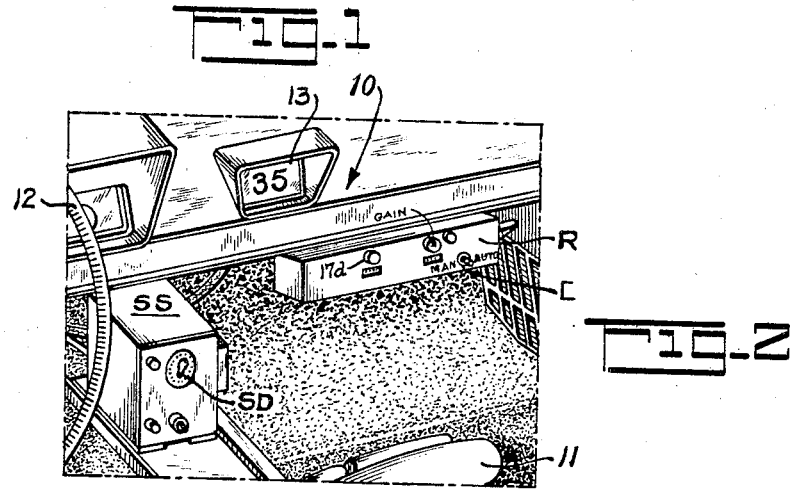
FIG. 2 is a partial interior view of the driver's station of a conventional motor car with speed control units embodying the system of the present invention.

The receiver R for this signal is located within a vehicle V, indicated as a motor car entering the zone. In a convenient and practical arrangement of the receiver R and associated speed selector unit SS, FIG. 2, this equipment is located beneath the instrument panel 10 so as to be readily accessible from the driver's seat 11. A suitable receiver antennae A, FIG. 3, may be mounted on the outside of the car. The selector unit is provided with the usual speed selector manual dial SD located adjacent to the steering wheel 12.

Figure 3:
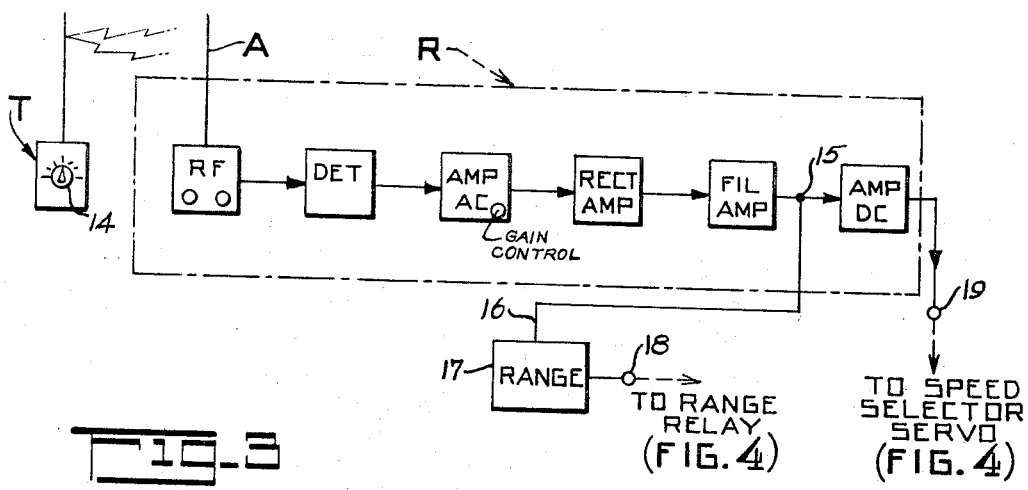
FIG. 3 is a block schematic illustration of the transmitter-receiver radio system for supplying control current to the speed selector servo system.

Referring to FIGS. 3, 4 and 5, the essential components of the complete system are diagrammatically indicated as a highway radio transmitter T and receiver R as mentioned above, and a combined servo motor and governor unit, FIGS. 4 and 5, that are responsive to the output or command signal of the receiver. The panel 10 may also include an indicator 13 that shows the command speed of the zone in which the car is traveling.

The highway radio transmitters $T_1$ and $T_2$ are preferably transistorized units for better compactness and portability. The circuitry thereof need not be shown in detail as it may comprise conventional means for generating spaced pulses with high frequency carrier. A crystal oscillator, for example, may be used to provide the carrier frequency; an adjustable rectangular wave modulator produces in known manner spaced modulation pulses, the spacing between the pulses being adjustable at the dial 14, FIG. 3, for representing the zone command speed as hereinafter explained.

The function of the radio receiver R is to convert the spaced modulated pulses to D.C. rectangular pulses, from which a steady D.C. current is obtained, the average magnitude of which depends on the pulse spacing and so corresponds to the command speed. FIG. 3 indicates conventional circuitry for so processing the input signal; for example, the RF input at the antennae-RF stage may comprise a neutralized tuned radio frequency receiver with diode detector DET. The output thereof is fed through a condenser couple transistor amplifier stage AMP-AC and as indicated through D.C. coupled amplifier stages, including rectifier and filter circuitry, RECT-AMP and FIL-AMP, to an intermediate output terminal 15. From this terminal, D.C. current is fed by lead 16 to biased transistor circuitry at 17 for establishing in known manner a threshold voltage at output terminal 18 for the range relay, FIG. 4, presently described. The terminal 15 also is connected to the input of a further stage of D.C. amplification, the output terminal 19 of which is connected to the speed selector servo circuitry, FIG. 4.

The speed selector motor SM, FIG. 4, is of the low power D.C. reversible type and is operated according to the voltage at the receiver output terminal 19 through the transistor circuitry as shown. A 12 volt D.C. supply is provided at input terminal 20 that in turn is connected through an overload cut-out, or fuse 21, and the contacts 22 of a RANGE RELAY, hereinafter described, to a bus conductor 23.

The effective control voltage on the motor SM is the resultant or difference voltage, between the D.C. speed control voltage and a reference voltage derived (either automatically by the motor, or manually) from a potentiometer unit P (herein for brevity termed "pot") having parallel-connected branch windings 24 and 25, each of which in effect constitutes a potentiometer. The unit P is connected to the bus 23 that is energized from the 12 volt supply (car battery), and is connected to the ground return through a resistance 48. The automatic control includes a mechanical connection indicated at 26 for connecting the slider contact 24' of pot 24 through a reduction gear box 27 to the motor shaft. The aforesaid connection is arranged for well-known null control wherein the slider contact 24' is moved in a direction tending to reduce the aforesaid difference voltage to zero, thereby de-energizing the motor. The slider 25' of the pot 25 can be adjusted as indicated by a dial SD for manual speed setting as hereinafter described.

Assuming now that the system is on automatic command speed control, the RANGE RELAY energized from the receiver terminal 18, FIG. 3, so as to be closed at contacts 22, and the related switches 22a and 22b are closed on AUTO (automatic control). The D.C. motor terminals at 30 and 31 are connected to a transistorized network for applying in a manner hereinafter described the aforesaid difference voltage to the motor. The 12 volt reference supply is applied from the bus 23 across the motor terminals according to the collector potentials on the cascade-connected transistors 32, 33, and 34, 35, that in turn depend on the voltages from the receiver terminal 19 and the pot slider 24'. As the respective voltages from the receiver terminal 19 and the pot slider 24' appearing on the corresponding collectors of the transistors 36 and 37 approach equality as the motor continues to adjust slider 24', the voltage across the terminals of motor SM approaches zero.

The circuitry including the transistors 36 and 37, together with the high impedance transistor 45, constitutes a differential amplifier of known characteristics having outputs at the collector electrodes of transistors 36 and 37. These outputs are connected as shown by conductors 39 and 40 to the respective base electrodes of the control transistors 41 and 42 that control the power supply transistors 32, 33 and 34, 35, respectively. Accordingly, at zero difference between the voltages $e_c$ and $e_p$ on the corresponding bases of transistors 36 and 37, the differential amplifier output is zero, as is the difference in voltages on the conductors 39 and 40 that are connected respectively to the bases of control transistors 41 and 42. Accordingly, transistors 41 and 42 conduct equally. As the collectors thereof are connected to the bases of the power supply transistors 32, 33, 34 and 35, these transistors also conduct equally. Because of the symmetry of the differential amplifier and the circuitry, including the transistors above, the voltage across motor SM is zero at the balanced condition where $e_c$ equals $e_p$, thereby de-energizing the motor. At this point, the motor shaft is positioned according to the command voltage on the receiver terminal 19, and the speed selector shaft 50 of the automatic governor G, FIG. 5, is correspondingly positioned.

As the transmitters $T_1$, $T_2$, etc., have short-range capability, and as a speed zone may extend for a material distance, the RANGE RELAY need not be locked in during this interval; that is, when the received transmitter signal fades out, the servo has already adjusted to the command speed so that the RANGE RELAY can drop-out to open the contacts at 22. The motor, now deenergized, remains in its adjusted position until the receiver picks-up a new command signal.

As the initial setting of the manual control C is assumed to be at AUTO, the ganged switches 22a and 22b are in readiness for re-energization of the RANGE RELAY at the next zone entry (through switch 22a) and for further automatic adjustment of the servo to the new command speed (through switch 22b). The RANGE RELAY may, if too fast-acting, have conventional time delay (dash pot, etc.) means for retarding its opening somewhat.

The RANGE RELAY control is such that the relay closes the power supply contacts 22 positively and without hesitation or chattering. To this end, threshold circuitry mentioned above for receiving the radio receiver signal from terminal 15, FIG. 3, controls energization of the relay. The circuitry 17 above may comprise, as shown in FIG. 4, a known arrangement such as a control transistor 17a energized from the 12 volt supply, and a current-passing transistor 17b, the base of which is connected to the receiver terminal 15 through a diode 17c and an adjustable range control at 17d. The range adjustment may be set according to the transmitter signal strength and the current requirements for positively closing the RANGE RELAY contacts 22.

When the car nears the terminus of zone $Z_1$ and is approaching the entry of zone $Z_2$, FIG. 1, the new command signal from transmitter $T_2$ is picked-up by the car receiver for producing, as described above, appropriate D.C. signals at the receiver terminals 15 and 19, FIGS. 3 and 4. The receiver signal from terminal 15 is not applied to the terminal 18, AUTO, at switch 22a until it reaches a sufficiently high, predetermined value for closing the RANGE RELAY as described above.

Practically concurrently, the new receiver command signal at terminal 19 is connected through switch 22b (AUTO) to the differential amplifier input (transistor 36) and is matched with the servo pot signal at the opposite input (transistor 37) so that the differential output is applied to the servo transistor circuitry for a new adjustment. The servo motor, having restored power through relay contacts 22, again adjust the slider 24' for null control; the selector speed setting accordingly now calls for the new command speed. As the $T_2$ signal fades with movement of the car into the zone, the RANGE RELAY again opens, removing power from the servo which remains "as is," and the $Z_2$ zone command setting now obtains until the next zone transmitter is reached. As mentioned above, the driver can override the complete control system at any time, i.e., by pressing the accelerator for a required speed increase, or by initial depression of the brake pedal for restoring basic control, FIG. 5.

Where the initial setting of control C, FIG. 4, is at MAN (manual), the RANGE RELAY is energized from the 12 volt supply through the now grounded switch 22a. Power is on the servo at all times during manual control, as the servo is now required to reset the speed selector at any time according to the driver's preference in setting dial SD.

The manually controlled pot signal at slider 25', rather than the zone command signal on lead 43, is now connected by the switch 22b and lead 29 to the differential amplifier input transistor 36. It will be apparent that, according to the driver's adjustment of pot slider 25' by dial SD, the voltage derived from pot winding 25 representing desired speed is matched at the differential amplifier 46 against the servo position voltage from pot slider 24' so that the resulting output of the amplifier controls the servo transistor circuitry in the manner described above for reducing said amplifier output to zero and thereby de-energizing the servo motor at the new speed setting. For desired calibration proportioning resistances 47 and 48 may be connected in series with the voltage supply and grounded terminals, respectively, of the pot P as shown.

Summarizing the operation of the radio receiver-servo system on AUTO, the RANGE RELAY supplies power to the servo transistor circuitry only when needed, i.e., in response to a new speed command signal from the receiver. The command voltage $e_c$, FIG. 4, amplified as required, is matched at the differential amplifier 46 with the servo pot position voltage $e_p$ and the difference voltage, depending in magnitude and sense on whether $e_p$ is greater or less than $e_c$, is applied by lead 39 or 40, as the case may be, to the respective control transistor 41 or 42, as described above, for operating the servo to a null condition. Specifically, in the case of unbalance where $e_c$ and $e_p$ are not equal, transistor 41 or 42 tends to "hog" the current supplied by the differential amplifier. In effect, either 41 or 42 becomes non-conducting, depending on the relative magnitudes of $e_p$ and $e_c$, and the motor SM is caused to rotate in the direction of balance. If transistor 41 "hogs" all the current, transistor 42 becomes non-conducting, i.e., functions as an open switch, and vice versa.

It will be understood that the invention is not limited to the specific servo control circuitry disclosed, and that alternative control can be used where suitable for adjusting the servo motor output shaft, or its equivalent, to a calibrated angular position that is directly related to a parameter, such as current magnitude, of the aforesaid command signal.

A practical application of the invention is shown more specifically by FIG. 5. Here, the automatic governor G is shown, for example, as of the type covered by United States Patent No. 3,245,494, granted Apr. 12, 1966, to D. J. Baxter for "Speed Governors and Control." The detailed operation thereof need not be described as reference can be made to said patent.

In substance, the servo motor SM is suitably mounted on the governor housing so that the output shaft from the reduction gearing 27 operates both the pot P (concentric winding type), and the shaft 50 of the speeder spring cam 51. In the original mode described in the patent, the cam shaft 50 is directly adjusted from the car dash by a dial SD' and mechanical connection at 52. This arrangement can alternatively be used for the "manual" mode in lieu of the servo motor, subject, of course, to provision of a suitable slip-clutch between the reduction gearing and shaft 50, and a restoring or "zeroing" adjustment of the dial SD' prior to AUTO operation.

In brief, the engine throttle TH is under limited governor control through the pneumatic line 60, bellows 61 and lost-motion linkage 62, and under overriding control by the spring biased accelerator ACC and direct linkage 63. Speed sensing in the governor is accomplished through a balancing valve (not shown), the stem of which is subjected at opposite ends to the speeder spring pressure, adjustable by cam 51, and a governor diaphragm that is subject in turn to a pump pressure generated at 64 in line 65 according to the engine or tach speed. The balancing valve, according to its final positioning by the aforesaid opposing forces, controls application of manifold pressure from line 66, normally open air valve 67, line 68, balancing valve, above, to the bellows 61 for adjusting the throttle TH.

The pump pressure also is applied by line 69 to a diaphragm-operated switch at 70 for normally maintaining the energization circuit of a master relay MR that is initially energized after closing of the ignition switch IG, and pushing in the holding-circuit knob 71. A second magnetically locked in or holding relay CR (clicker relay) controls the actuating solenoid 72 of the air valve 67 according to a brake-controlled (normally closed) switch BK in circuit with the master relay MR, pressure switch 70 and holding contacts of the relay CR. When the relay CR de-energizes the air valve solenoid to close the valve 67, the governor manifold line 68 is shut off, thereby disabling the throttle bellows 61. This condition is visibly indicated by the signal light L.

A switch (not shown) within the governor is normally closed by diaphragm pressure from pump 64 during engine operation and is connected by lead 73 to the CR holding relay for establishing a second holding circuit therefor through the brake switch BK, diaphragm switch 70 and the closed contacts of master relay MR. When, due to pressure on the brake pedal and opening of switch BK, the relay CR is temporarily cut out, thereby closing the air valve and disabling the throttle bellows, the governing operation can be restored by pressing the push button 74 again to pick up the relay CR and reopen the air valve, subject, of course, to release of brake pressure. Special safety features inherent in the governor system outlined above are more fully described in the Baxter patent above.

It will be apparent that switch circuitry modifications in the governor system per se above may be made for flexibly integrating it, as desired, with the radio-servo governor control of FIGS. 1–4.

It should be understood that this invention is not limited to specific details of construction and arrangement thereof herein illustrated, and that changes and modifications may occur to one skilled in the art without departing from the spirit of the invention.

We claim:
1. A speed governing system for power vehicles moving along a highway defining limited speed zones comprising:
   (a) a source of zone signals having a parameter that determines the zone command speed, stationed along the highway at a point near the zone entry;
   (b) a signal receiver in said vehicle for picking up the transmitted command signals in the zone entry area;
   (c) an automatic speed governor for said vehicle having an adjustable request-speed setting;
   (d) servo means arranged for adjustment of said speed setting:
   (e) feedback means for producing a signal that is variable with adjustment of said governor setting;
   (f) the output of said receiver constituting a control signal, a parameter of which has a direct relation to that of said command signal parameter; and
   (g) means responsive jointly to the receiver output signal and to said feedback signal for positioning the servo so that the governor speed setting corresponds to said zone command speed.

2. A speed governing system as specified in claim 1 wherein the servo means is energized in sense and magnitude by the jointly responsive means according to the difference between said receiver output and feedback signals for null-positioning of the servo at the command speed setting.

3. A speed governing system as specified in claim 1 wherein the servo means is a D.C. motor and the feedback means is a potentiometer that is energized from a constant voltage D.C. source, said potentiometer being adjustable by said servo for deriving a position voltage constituting the feedback signal.

4. A speed governing system as specified in claim 1 wherein a circuit controller is operable according to a predetermined value of the receiver output as the vehicle approaches the zone entry for completing a power supply circuit for the servo means.

5. A speed governing system as specified in claim 4 wherein the circuit controller is a range relay that is operable through threshold circuitry from the receiver output for supplying power to the servo means upon predetermined build-up of the command signal, and for cutting off said power in response to fade-out of the receiver command signal, said servo remaining in its adjusted position until receiving another command speed signal from the receiver.

6. A speed governing system as specified in claim 5 wherein the range capability of the source of zone signals is limited to approximately the zone entry area, and the range relay is adjusted for operation immediately prior to zone entry, the receiver output beyond said area fading to cut out servo power so that the servo remains deenergized at the adjusted speed setting throughout the remainder of the zone, said range relay being subject to alternate control for holding power on the servo in the manual control mode.

7. A speed governing system as specified in claim 2 wherein the jointly responsive means is a differential amplifier, the difference signal output of which biases transistor circuitry connected to the servo and to a voltage supply for determining the magnitude and sense of application of the supply voltage to the servo.

8. A speed governing system as specified in claim 7 wherein the differential amplifier has two biasing outputs, and the difference voltage is selectively applied from either output to the transistor circuitry connected between the voltage supply and a respective terminal of the D.C. motor for controlling its direction according to the dominant signal to the differential amplifier.

9. A speed governing system as specified in claim 1 wherein an alternate manual control in lieu of zone speed control is provided for energized the servo means according to manual positioning of a request-speed control, said alternate control producing a signal that corresponds to the request-speed, said request-speed signal causing jointly with the feedback signal positioning of the servo to the request-speed setting.

10. A speed governing system as specified in claim 1 wherein the automatic speed governor is of the balanced-force type for speed sensing having a speeder spring subject to the servo setting for opposing a force representing actual vehicle speed, and the servo concurrently adjusts both said speeder spring and said feedback means through a reduction gearing.

References Cited

UNITED STATES PATENTS

| | | | |
|---|---|---|---|
| 2,656,002 | 10/1953 | Keeton et al. | 180—98 X |
| 2,780,300 | 2/1957 | Beyer | 180—98 X |
| 2,846,630 | 8/1958 | Boyle et al. | 318—28 |
| 3,007,538 | 11/1961 | Hill | 180—98 |
| 3,008,532 | 11/1961 | Reed | 180—98 |
| 3,042,136 | 7/1962 | Havnen | 180—98 |
| 3,070,185 | 12/1962 | Fales | 123—102 X |
| 3,110,851 | 11/1963 | Plogstedt et al. | 318—28 |
| 3,116,807 | 1/1964 | Wilson | 123—102 X |
| 3,195,671 | 7/1965 | Wolfe | 180—98 |
| 3,245,494 | 4/1966 | Baxter | 180—108 |

KENNETH H. BETTS, *Primary Examiner.*